Figure 1:
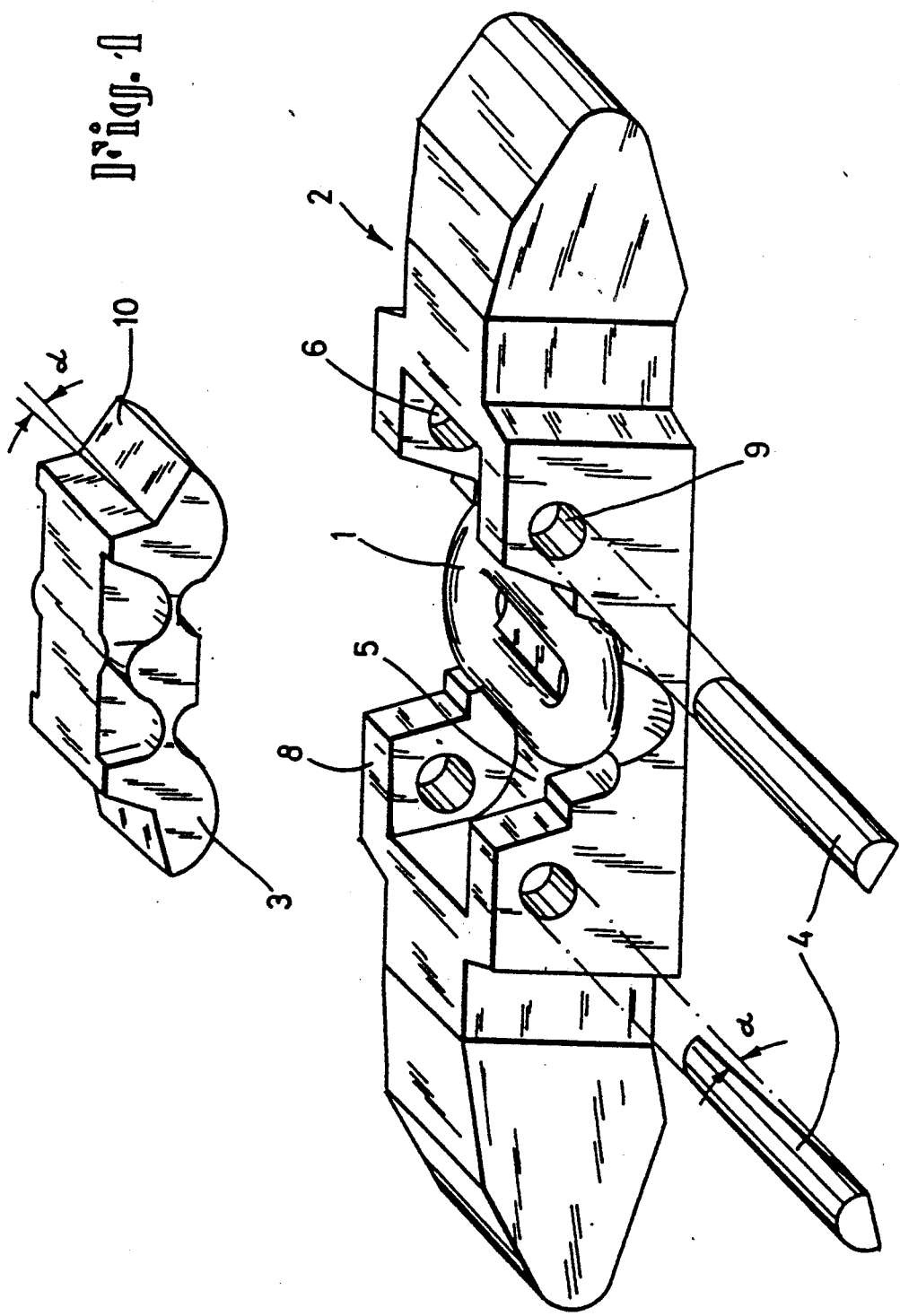

United States Patent [19]

Komotzki

[11] Patent Number: 4,989,724
[45] Date of Patent: Feb. 5, 1991

[54] FASTENING ARRANGEMENT FOR THE ENTRAINING ELEMENTS OF CHAIN CONVEYORS

[76] Inventor: Michael Komotzki, Gernotstr. 4, D-4600 Dortmund 13, Fed. Rep. of Germany

[21] Appl. No.: 273,814
[22] PCT Filed: Feb. 11, 1988
[86] PCT No.: PCT/DE88/00062
    § 371 Date: Oct. 12, 1988
    § 102(e) Date: Oct. 12, 1988
[87] PCT Pub. No.: WO88/06136
    PCT Pub. Date: Aug. 25, 1988

[30] Foreign Application Priority Data

Feb. 13, 1987 [DE] Fed. Rep. of Germany ....... 3704509
Feb. 25, 1987 [DE] Fed. Rep. of Germany ....... 3705914

[51] Int. Cl.⁵ .............................................. B65G 19/24
[52] U.S. Cl. ..................................... 198/731; 198/733
[58] Field of Search ............... 198/731, 734, 725–730; 403/319, 356, 358, 378, 379, 383

[56] References Cited

U.S. PATENT DOCUMENTS

| | | | |
|---|---|---|---|
| 1,048,848 | 12/1912 | Miner | 198/733 |
| 2,756,869 | 7/1956 | Merck et al. | 198/731 |
| 2,832,246 | 4/1958 | Livermont | 403/379 X |
| 4,171,822 | 10/1979 | Thun | 403/379 X |
| 4,579,477 | 4/1986 | Hartman | 403/379 X |
| 4,768,750 | 9/1988 | Wilson | 403/379 X |

FOREIGN PATENT DOCUMENTS

| | | | |
|---|---|---|---|
| 2031874 | 1/1972 | Fed. Rep. of Germany | 198/731 |
| 2353005 | 4/1975 | Fed. Rep. of Germany | |
| 2908683 | 1/1981 | Fed. Rep. of Germany | |
| 0988684 | 1/1983 | U.S.S.R. | 198/731 |
| 1420326 | 1/1976 | United Kingdom | 198/731 |
| 2034269 | 6/1980 | United Kingdom | 198/731 |

Primary Examiner—H. Grant Skaggs
Assistant Examiner—James R. Bidwell
Attorney, Agent, or Firm—Peter K. Kontler

[57] ABSTRACT

An entraining element for a chain conveyor includes an elongated member having a recess which confines a link of the conveyor. The entraining element further includes a clamping member which is complementary to the recess and the link and holds the latter in the recess. The clamping member is provided with a pair of flanges, and the clamping member and the link are locked in the recess by wedges which engage the flanges. The wedges extend transverse to the elongation of the elongated member and can be inserted in openings formed in the elongated member or in spaces defined by the elongated member and the flanges.

11 Claims, 2 Drawing Sheets

FASTENING ARRANGEMENT FOR THE ENTRAINING ELEMENTS OF CHAIN CONVEYORS

The invention relates to a fastening arrangement for an entraining element of chain conveyors, particularly for underground mining.

A fastening arrangement of this character for entraining elements of single-chain, central double-chain and outer double-chain conveyors is known, for example, from the West German Offenlegungsschrift No. 23 53 005 and the West German Auslegeschrift No. 29 08 683. Fastening of the chain link to the entraining element currently takes place by means of a chain clamp which is complementary to the chain link. The chain link and chain clamp are disposed in a suitable complementary receiving space of the entraining element proper. The chain clamp has two vertically extending bolts which pass through corresponding bores in the entraining element and fastening screws must be threaded onto the bolts. The bolts extend vertically upwards so that the screws are accessible from above thereby allowing an entraining element which has become worn, for example, to be dismantled.

The known varieties of this fastening arrangement have the disadvantage that the chain clamp is expensive to manufacture since the upwardly extending bolts must be equipped with threads. Exchange of an entraining element is time-consuming because the screws are normally corroded and, accordingly, difficult to loosen. Finally, it is necessary to carry out the exchange with special tools, namely, appropriate screw drivers and the like. Further, the loosened nuts may be lost and the thread of the upwardly projecting shaft of the chain clamp is frequently damaged so that the chain clamp can no longer be used.

It is an object of the invention to create a fastening arrangement which is simpler to manufacture and install while providing equally good fastening of the entraining element to the drag chain.

This object of the invention is achieved by providing the entraining element proper with a receiving space for the chain, clamp. However, fixing of the chain clamp in this receiving space of the entraining element no longer takes place via screw means. Rather, fixing occurs by means of wedges so that fastening of the entraining element to the chain link via two driven-in wedges takes place due to the wedge slope. By virtue of the wedge slope, the chain clamp is pressed against the chain link.

In this manner, more rapid installation and less expense for installation tools are achieved. Of particular importance is the elimination of the thread so that damage can no longer occur and manufacture of the actual chain clamp is simplified.

Exemplary embodiments of the invention are described below with reference to the drawings.

Figure 2:
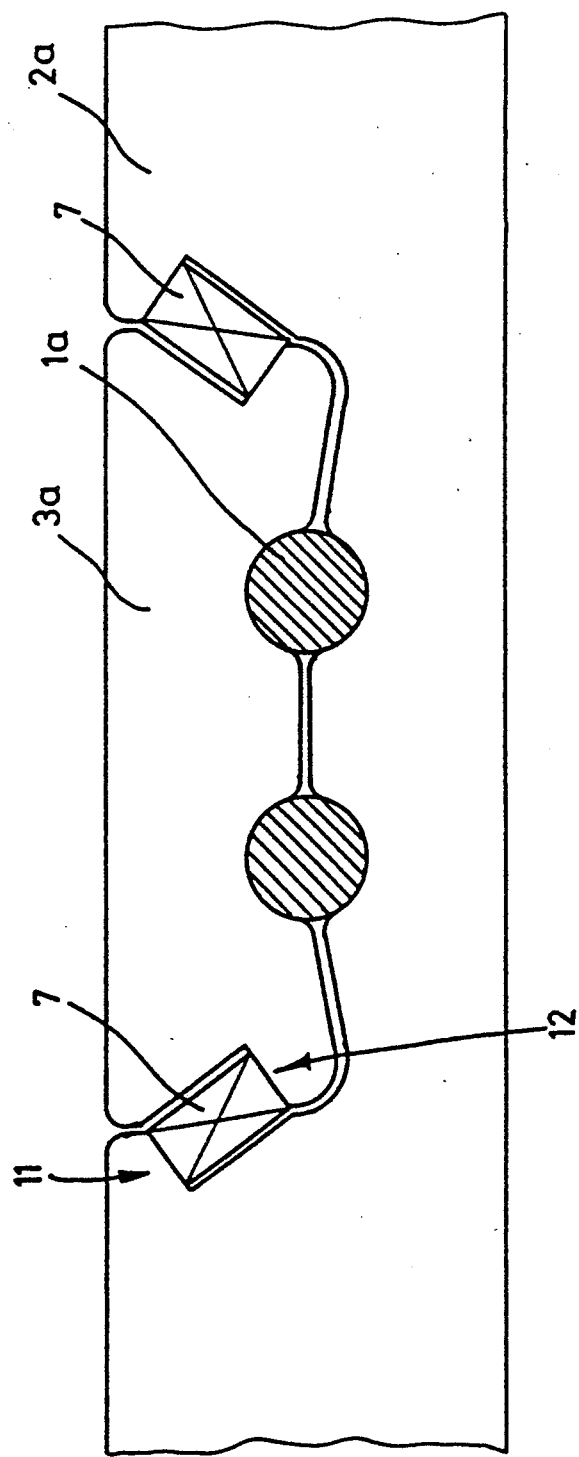

In the drawings:

FIG. 1 schematic exploded view of a first embodiment with only one chain link being illustrated for clarity; and FIG. 2 is a sectional view of a modified embodiment.

In FIG. 1, a chain link is denoted by 1 and, together with additional chain links, forms the drag chain proper. An entraining element 2, which slides in a non-illustrated conveying trough, is to be fixed to this drag chain.

A suitable receiving space 5 is provided within the entraining element in order to fix the entraining element 2 to the chain link 1 of the drag chain. This receiving space 5 can be closed by a chain clamp 3. The inside of the receiving space 5 and the downwardly facing side of the chain clamp 3 in FIG. 1 of the drawing are shaped in such a manner that a form-fitting fixing of the chain link 1 is obtained.

Two semicircular wedges 4 are provided in order to arrest the chain clamp 3 in the receiving space. The receiving space 5 is bounded by side walls 8 and receiving spaces 6 in the form of bores 9 are provided in these side walls 8. By inserting the wedges in the bores 9 of all four side walls 8, the wedges engage arresting flanges 10 on the chain clamp 3 from above and thereby press the chain clamp 3 onto the chain link 1. In order to achieve and improve the requisite fixing and form-fitting arrest of the chain clamp 3 in the receiving space 5, the wedges are provided with a wedge slope alpha illustrated in FIG. 1. The arresting flanges 10 have a corresponding slope as shown.

It can be seen that, with these means, a satisfactory, reliable fixing of the chain link 1 in the entraining element 2 by the chain clamp 3 can be achieved, and that the fastening means can be readily released without the need for special tools. Also, production of the connecting means proper is simpler than for the connecting means of the prior art.

From the illustration in FIG. 2, it can be seen that wedges 7 in the form of parallelepipeds are used instead of the semicircular wedges 4 to thereby fix the chain link 1a in the entraining element 2a through the intermediary of the chain clamp 3a. Arresting flanges 12 for the wedges are machined into the chain clamp 3a and corresponding arresting shoulders 11 are provided in the entraining element 2a. Preferably, the central axis of the wedge is not perpendicular to the longitudinal axis of the entraining element 2a but is inclined to this longitudinal axis so as to improve the wedging action.

What is claimed is:

1. An entraining element for a chain conveyor having a conveying chain which includes a multiplicity of interconnected links, said entraining element comprising a confining member having a longitudinal axis and a recess designed to confine at least one of said links in such a manner that said chain conveys said confining member along a predetermined direction transverse to said axis, said confining member further having at least one passage which opens to said recess and extends along said predetermined direction, and said one link and said recess together defining a space having a predetermined configuration when said one link is in said recess; a clamping member receivable in said recess to clamp said one link therein, said clamping member having a configuration complementary to said predetermined configuration and at least one wedge receivable in said passage and designed to urge said clamping member against said one link so as to lock the latter in said recess.

2. The entraining element of claim 1, wherein said confining member is provided with another passage which opens to said recess and extends along said predetermined direction; and further comprising another wedge receivable in said other passage and designed to urge said clamping member against said one link.

3. The entraining element of claim 2, wherein said confining member is provided with two pairs of opposed walls, the walls of each pair being located on opposite sides of said recess as considered along said predetermined direction, and each of said walls being provided with an opening which extends along said predetermined direction, the openings of each pair of walls being in register, and the openings of one pair of walls respectively constituting part of said one passage, the openings of the other pair of walls respectively constituting part of said other passage.

4. The entraining element of claim 2, wherein said clamping member is provided with a pair of flanges designed to be engaged by respective ones of said wedges.

5. The entraining element of claim 1, wherein said clamping member is provided with a flange, said wedge having a generally semicylindrical configuration and a substantially planar face designed to bear against said flange.

6. The entraining element of claim 5, wherein said wedge has a predetermined slope and said flange has a slope substantially equal to that of said wedge.

7. The entraining element of claim 1, wherein said confining member has a shoulder and said clamping member has a flange which is arranged to define a space with said shoulder, said wedge being receivable in said space so as to engage said shoulder and said flange.

8. The entraining element of claim 7, wherein said wedge is polygonal.

9. The entraining element of claim 8, wherein said wedge is substantially rectangular.

10. The entraining element of claim 7, wherein said shoulder and said flange has a slope substantially equal to that of said wedge.

11. The entraining element of claim 1, wherein said wedge is free of threads.

* * * * *